Jan. 3, 1956
J. E. STUMP
2,729,373
WATER BAG CARRIER
Filed July 8, 1953
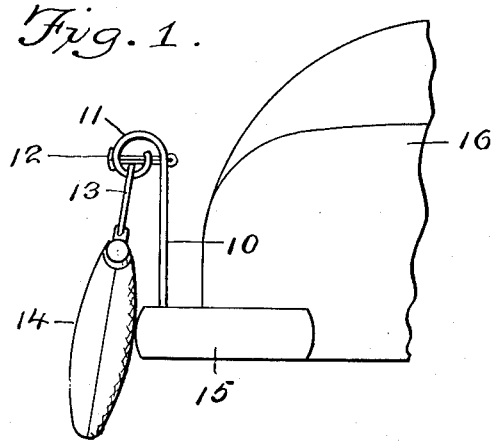
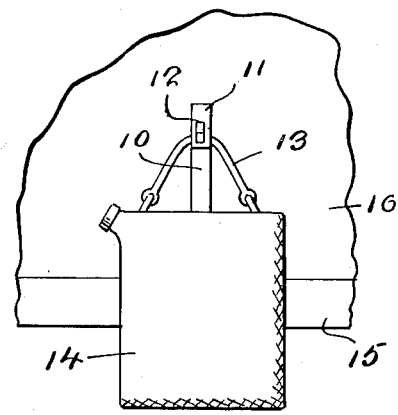
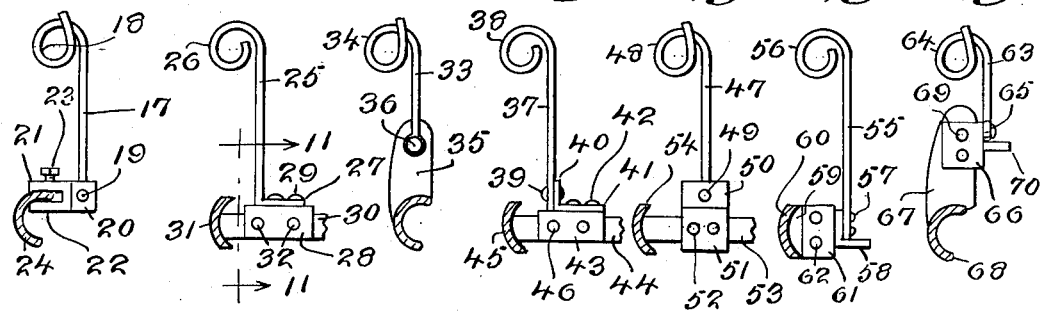
INVENTOR.
James Elliott Stump
BY Victor J. Evans & Co.
ATTORNEYS

United States Patent Office 2,729,373
Patented Jan. 3, 1956

2,729,373
WATER BAG CARRIER
James Elliott Stump, Grand Junction, Colo.

Application July 8, 1953, Serial No. 366,645

1 Claim. (Cl. 224—42.03)

This invention relates to brackets adapted to be attached to motor vehicles and particularly to bumpers and mounting elements thereof, and in particular a bracket having a loop or hook on the upper end with clamping or other mounting means on the lower end for attaching the bracket to the bumper or to the support of a bumper of a motor vehicle whereby the bracket provides means for carrying a water bag in a suspended position from a point above a bumper of a motor vehicle.

The purpose of this invention is to provide means for suspending a water bag on the outside of a motor vehicle whereby the water bag is subjected to air currents passing over or around the vehicle so that water in the bag remains at a comparatively low temperature.

Brackets of various types and designs have been attached to outer surfaces of motor vehicles for supporting baggage, rods, and other objects and devices on the outer surface of the vehicle, however, such devices are not adapted for carrying a water bag as it is desired to suspend a water bag from a point where drip from condensation on the outer surface of the bag drops free of the vehicle. With this thought in mind this invention contemplates a bracket having a spring arm with a loop or other bag holding element at the upper end and a clamp or other mounting means on the lower end whereby the bracket may readily be attached to a bumper or other part of a motor vehicle and wherein a water bag may readily be suspended by the upper end of the spring arm.

The object of this invention is, therefore, to provide means for forming a bracket that may readily be attached to a bumper or other part of a motor vehicle in which the upper end of the bracket is adapted to receive a handle of a water bag.

Another object of the invention is to provide means for suspending a water bag on the outside of a motor vehicle wherein resiliency is provided in the supporting means to eliminate the possibility of shock loads tearing a handle by which a water bag is suspended from the water bag.

A further object of the invention is to provide a resilient bracket for suspending a water bag from a motor vehicle in which the bracket is of a simple and economical construction.

With these and other objects and advantages in view the invention embodies an arm formed of wire, a thin narrow band, or other material having spring or resiliency therein with mounting or clamping means at the lower end and with a loop or other means at the upper end for receiving a handle of a hot water bottle.

Other features and advantages of the invention will appear from the following description taken in connection with the drawing, wherein:

Figure 1 is an elevational view showing a portion at the rear of the motor vehicle body illustrating a water bag suspended by a bracket mounted on the bumper of the vehicle, the forward portion of the body of the vehicle being broken away.

Figure 2 is a rear elevational view of the bracket and supporting means shown in Fig. 1.

Figure 3 is a detail illustrating a modification wherein the bracket is formed with a spring wire having a coil in the upper end and a clamp for securing the bracket to the upper edge of a bumper, on the lower end.

Figure 4 is a view showing another modification of the bracket wherein the lower end of the arm is mounted with a U-shaped clamp on a bumper supporting member.

Figure 5 is a further modification wherein a spring wire is attached by a bolt to a bumper guard.

Figure 6 shows another modification wherein the arm shown in Fig. 4 is attached to the U-shaped mounting clamp with a clip angle.

Figure 7 shows another modification wherein the mounting elements at the lower end of the arm are turned to an angle of 90 degrees.

Another modification is shown in Figure 8 wherein the spring arm is attached with a clip angle to a plate on the inside of a bumper.

Figure 9 shows another modification wherein the spring arm is attached to a bumper guard with a mounting member.

Figure 10 is an end elevational view looking toward the inside of the bracket mounting shown in Fig. 5.

Figure 11 is a cross section through the bracket mounting being taken on line 11—11 of Fig. 4.

Figure 12 shows a further modification wherein the spring arm shown in Fig. 5 is attached to a bumper guard with a plurality of bolts.

Figure 13 shows a further modification wherein a spring arm is attached directly to the bumper with an eye bolt and with the lower end of the guard extended through the bumper.

Figure 14 is a view similar to that shown in Fig. 10 with a loop shown at the upper end of the spring arm.

Figure 15 is a view illustrating a clamp used in Figs. 3 and 9 for attaching the bracket to the bumper and guard.

Referring now to the drawing wherein like reference characters denote corresponding parts the improved water bag bracket of this invention includes, as illustrated in Figs. 1 and 2, a band 10 having a loop 11 at the upper end with a bolt 12 extended through the loop for securing a handle 13 of a water bag 14 therein, with the bag suspended from a bumper 15 of a motor vehicle as indicated by the numeral 16.

With the parts formed in this manner the bolt or cotter key 12 is removed when it is desired to remove or replace the water bag, and it will be understood that the lower end of the arm 10 is secured to the bumper 15 or bumper arm, preferably by a clamp such as shown in Figures 3, 4, 6, 7, or 15, or by a bolt through the bumper or bumper arm, as in Figures 5, 10 and 14, or by being welded to the bumper support arm.

In the design illustrated in Fig. 3 a spring arm 17 having a loop 18 at the upper end is secured by a bolt 19 to a tongue 20 of a U-clamp having spaced jaws 21 and 22 and a screw 23 and, as shown in the drawing, the clamp is secured to the upper edge of a bumper 24, the jaws 21 and 22 being held by the screw 23 whereby the arm 17 is retained in an upright position so that a handle of the water bag may be placed in and removed from the loop 18.

In the design illustrated in Fig. 4, a spring arm 25 having a loop 26 at the upper end is provided with a flange 27 that is secured to a U-clamp 28 with rivets 29 and the clamp 28 is secured to a support bar 30 of a bumper 31 with bolts 32.

In the design illustrated in Fig. 5 a spring arm 33 having a loop 34 on the upper end is secured to a bumper guard 35 with a bolt 36 through a closed eye also a part of the spring arm.

In Fig. 6 a spring arm 37 having a loop 38 at the upper end is secured by a rivet 39 to a vertically disposed leg 40 of a clip angle 41, the clip angle being secured with rivets 42 to a U-shaped clamp 43 and the clamp 43 is secured to a support bar 44 of a bumper 45 with bolts 46.

In Fig. 7 a spring arm 47 having a loop 48 at the upper end is mounted with a bolt 49 on a tongue 50 extended upwardly from a U-clamp 51, the clamp being secured with bolts 52 to a support bar 53 of a bumper 54.

In Fig. 8 a spring arm 55 having a loop 56 at the upper end is secured by a rivet 57 to a clip angle 58, and the clip angle 58 is secured by a plate 59 to a bumper 60 by welding, or other suitable means. The clip angle 58 is provided with a mounting plate 61 that is secured to the plate 59 with bolts 62 the same as the plate 51 in Figure 7, or the plate may fit the bumper guard as shown in Figure 9.

A spring arm 63 having a loop 64 on the upper end, as shown in Fig. 9 is secured by a rivet or bolt 65 to a U-shaped clamp 66 and the clamp 66 is secured to one side of a guard 67 of a bumper 68 with rivets or set screws 69, the set screws being on inside of bumper arm.

Figure 10 shows a spring arm 71, similar to the arm 33 shown in Fig. 5, secured to one side of a guard 72 with a bolt 73, the guard 72 being extended upwardly from a bumper 74.

In Fig. 11 a spring band 75 having a loop 76 at the upper end is mounted by a U-shaped bracket 77 on a support bar 78 of a bumper, the clamp being held to the bar with a set screw 79.

In Fig. 12 a spring arm 80 having a loop 81 at the upper end is secured to one side of a bumper guard 82 with bolts 83, and in Fig. 14 a similar spring arm 84 having a loop 85 at the upper end is secured to a bumper guard 86 with a bolt 87.

In Fig. 13 a spring arm 88 having a loop 89 at the upper end is provided with a right angularly positioned end 90 that extends through an opening in the lower part of a bumper 91. The end 90 is provided with a nut 92 by which the bracket is secured in position and the lower portion of the arm 88 extends through an eye 93 having a shank 94 and a nut 95 on the shank retains the eye in the position shown.

The clamp body 96 illustrated in Fig. 15 is provided with jaws 97 and 98 and a tongue 99, and as illustrated in Figs. 3 and 9 the spring arm of the water bag bracket may be bolted to the clamp with a bolt extended through an opening 100, or to the tongue 99 with a bolt extended through the opening 101. The jaws 97 and 98 of the clamp are provided with bolt holes 102 through which bolts or set screws may be positioned for clamping the device on a bumper or bumper support.

It will be appreciated that the various types of brackets are required because substantially each make of motor vehicle uses a bumper of a different design and in order to facilitate mounting the water bag bracket on different types of motor vehicles a different bracket is provided.

With the parts formed in this manner the handle 13 of a water bag 14 may readily be placed in a loop at the upper end of one of the spring arms whereby the water bag will be suspended, as illustrated in Fig. 1 and shocks and jars resulting from wheels of the vehicle traveling over obstructions are substantially absorbed by the spring arm 10 or by the spring arms of the other designs whereby extreme shock loads are not transmitted to the handle of the water bag. The water bag is, therefore, free to respond to uneven sections of roads or highways and there is very little possibility of the shock loads breaking the handle of the water bag.

It will be understood that other modifications, within the scope of the appended claims, may be made in the design and arrangement of the parts without departing from the spirit of the invention.

What is claimed is:

In a water bag supporting bracket for use on a bumper of a motor vehicle, the combination which comprises a vertically disposed bar having an attaching means on the lower end and having a coil providing a hook for retaining a handle of a water bag on the upper end, said hook including a U-shaped section having vertically disposed arms connected at their lower ends with an arcuate section and positioned with one of said arms connected to the upper end of said vertically disposed bar with an arcuate section which extends over the other arm, said arms and bar having aligned openings extended therethrough and a fastener extended through the aligned openings for retaining the handle of a water bag in said U-shaped section, and said attaching means being adapted to attach the bar to a guard of a motor vehicle bumper.

References Cited in the file of this patent

UNITED STATES PATENTS

| 2,521,221 | Ivey | Sept. 5, 1950 |
| 2,594,640 | Grevling | Apr. 29, 1952 |
| 2,628,750 | Palmer | Feb. 17, 1953 |

FOREIGN PATENTS

| 14,912 | Great Britain | of 1884 |